Figure 1:
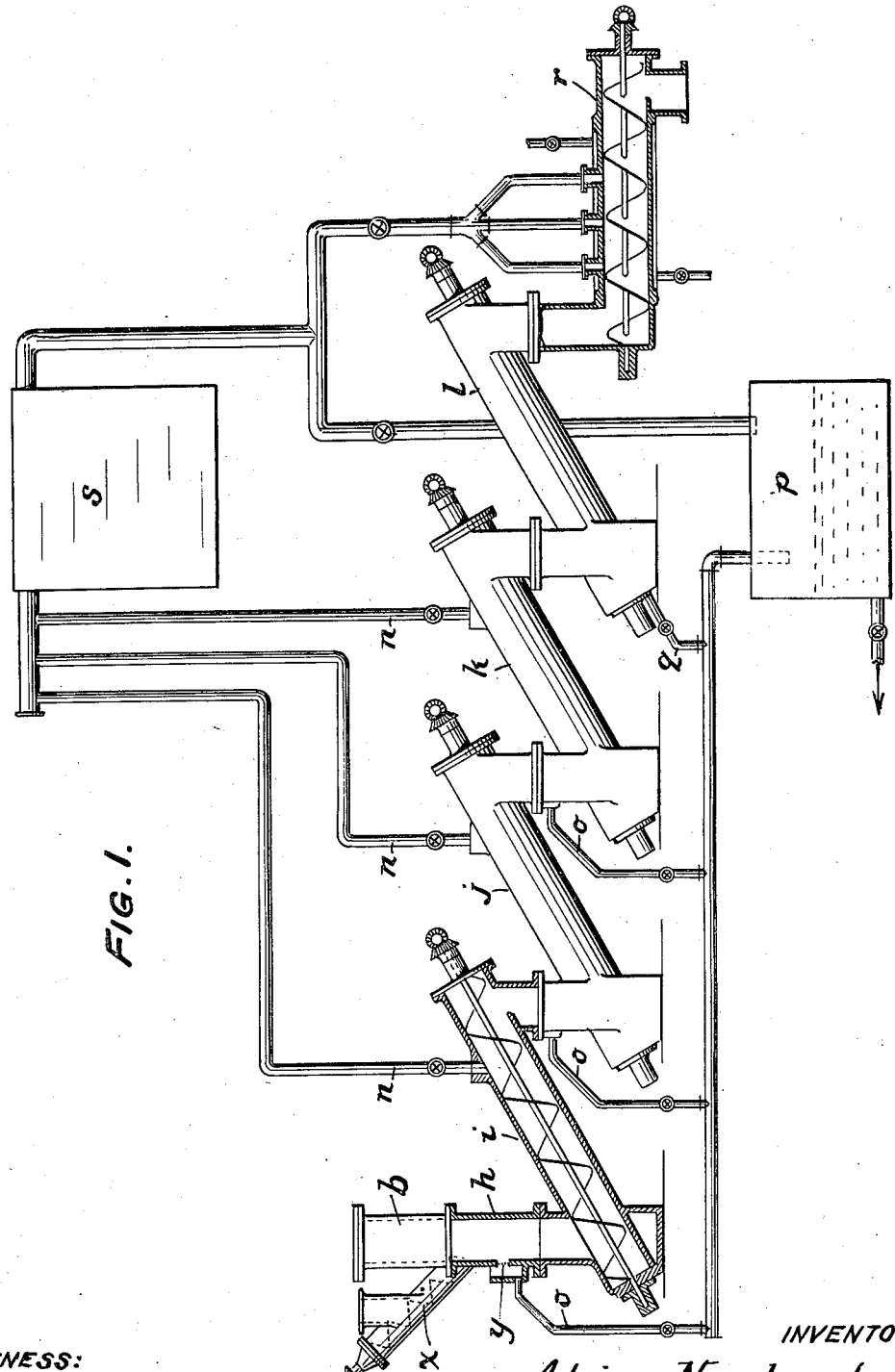

A. NAGELVOORT.
PROCESS OF RECOVERING LIQUIDS USED FOR SEPARATING SOLIDS OF DIFFERENT SPECIFIC GRAVITIES.
APPLICATION FILED JUNE 16, 1916.

1,244,884.

Patented Oct. 30, 1917.
2 SHEETS—SHEET 1.

WITNESS:

INVENTOR
Adriaan Nagelvoort
BY
Frank S. Busser
ATTORNEY.

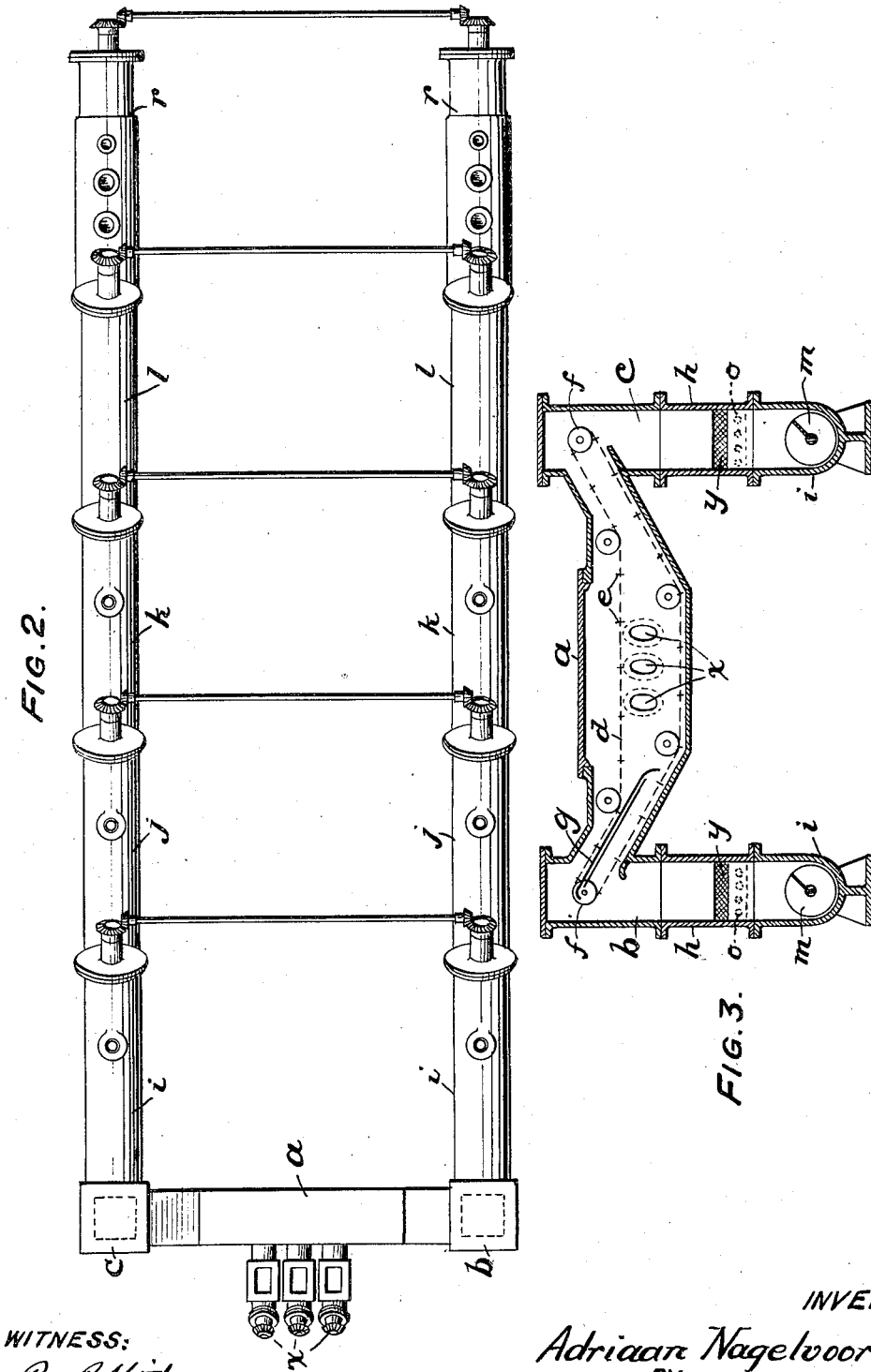

UNITED STATES PATENT OFFICE.

ADRIAAN NAGELVOORT, OF NEW YORK, N. Y., ASSIGNOR, BY MESNE ASSIGNMENTS, TO VIRGINIA HALOID COMPANY, OF WILMINGTON, DELAWARE.

PROCESS OF RECOVERING LIQUIDS USED FOR SEPARATING SOLIDS OF DIFFERENT SPECIFIC GRAVITIES.

1,244,884.     Specification of Letters Patent.     Patented Oct. 30, 1917.

Application filed June 16, 1916. Serial No. 103,937.

*To all whom it may concern:*

Be it known that I, ADRIAAN NAGELVOORT, a citizen of the United States, residing at New York, county of New York, and State of New York, have invented a new and useful Improvement in Processes of Recovering Liquids Used for Separating Solids of Different Specific Gravities, of which the following is a full, clear, and exact description, reference being had to the accompanying drawings, which form a part of this specification.

In the gravity separation of solids by means of a liquid, a certain amount of the liquid is carried off with the separated constituents. The separating liquid is usually too valuable to be lost and an economical practice of the process necessitates the recovery of the liquid so carried off by the solids so that it may be returned to the separating tank.

As applied to the separation of pure iron ores from silicious gangue, certain of the bromids as separating liquids possess distinct advantages, as their specific gravities approximate closely to a desirable mean between the specific gravity of the pure ore, which approximates 4.00, and that of the gangue, which approximates 2.66.

In the use of antimony bromid as a separant, it is necessary to carry on the process at a high degree of heat, the melting point of this substance being about 93° C. and it is necessary to calcine the ore. It has been proposed to recover the antimony bromid (or whatever bromid or mixture of bromids is used as a separant) by conveying the separated solids through a tank containing alcohol which is a solvent of the bromid, and has a lower volatilizing point than the bromid, and subjecting the solution thus obtained, at a plurality of points, to heat sufficient to volatilize the alcohol but insufficient to volatilize the bromid, the solvent vapors being condensed and returned to the recovery tank and caused to flow in reverse direction to the travel of the solids. In the alcohol method, the liquid which overflows at the entrance end of the tank is bromid in alcoholic solution and is subjected to distillation to separate the alcohol from the bromid. The solids emerging from the recovery tank carry off a certain amount of alcohol, which is recovered by immersing the solids in water, which is heated to a temperature above the volatilizing point of the alcohol, the vapors of the alcohol being condensed and returned to the separating tank.

My present process has for its object to carry on the separating process and also the process for the recovery of the separant at a heat not over ordinary living temperatures. For this purpose I propose to use either tin bromid or arsenious bromid. Liquid tin bromid has a specific gravity of 3.35, a melting point of 29° C. and a boiling point of 203° C. Liquid arsenious bromid has a specific gravity of 3.36, melts at 31° C. and boils at 221° C. These substances may be regarded as equivalents for the purpose of my invention in its broadest aspect, still tin bromid is distinctly preferable in that it is relatively insensitive to water or moisture and will absorb substantially no moisture from the atmosphere and therefore is available for use without the necessity for taking precautions to prevent absorption of water that the economical use of arsenious bromid requires. Further, I believe I am the first to discover that carbon bisulfid will act as a solvent for tin bromid. Where, therefore, I claim tin bromid I mean, in such claims, to confine myself to tin bromid.

Owing to the lower specific gravity of the liquid tin bromid (3.35) and the liquid arsenious bromid (3.36) as compared with liquid antimony bromid (3.65) and to the fact that no high heat is needed in the process, it is not necessary to increase the specific gravity of the ore by calcination. The specific gravity of limonite (oxid of iron with combined water) being much lower than that of hematite (oxid of iron with no combined water) it naturally takes a liquid of lower specific gravity to produce a given separating result on the uncalcined ore than that which is required to produce the same result on calcined ore.

To recover the separant I propose to subject the solids carrying a certain portion of the separating liquid to the action of a liquid which is a solvent of the separant and whose boiling point, while above the melting point of the separant, is substantially within the natural temperature range, the process being carried on at a temperature above the melting point of the separant and below the boiling point of the solvent, so that the removal of the bromid from the solids may be effected without necessitating the application of artificial heat. The solvent liquid must also be one which unlike alcohol does not react (either cold or at the distilling temperature) on the separant with which it dissolves nor on the ores which are being separated. The solvent that I prefer to employ is bisulfid of carbon, which has a boiling point of 46.2° C., which is so far below the boiling point of the bromids specified that it may readily be separated from either of them by simple distillation.

In order that those skilled in the art may readily carry out my process, I have shown, in the accompanying drawings, the apparatus that I prefer to use, it being understood, however, that the successful practice of the process is not dependent upon the employment of any particular apparatus.

Figure 1 is a side view, partly in section, of the apparatus. Fig. 2 is a plan view of the same. Fig. 3 is a longitudinal section through the separator.

The ore, after being washed free from clay and crushed to a suitable size and dried of hygroscopic moisture, is fed to the separator by means of three inclined ribbon screw conveyers $x$, inclosed in iron castings and bolted to the separator body at a point half way between the bottom of the separating tank and the intended level of the liquid therein. The separator is constructed on the principle common to the separators disclosed in the patents to F. I. du Pont, No. 994,950, No. 1,014,624, and No. 1,106,195. It comprises a box-shaped cast iron body $a$ filled to a certain level with the separant and provided with two discharge openings, one, $b$, for tailings, and the other, $c$, for the relatively pure iron ore. Two endless chains $d$, connected together by steel flights $e$ and driven and guided by sprocket wheels $f$, operate to remove the solids from the separating bath and carry them to the recovery conveyers. The flights $e$, in their travel in one direction, skim the top of the separant and carry the tailings upward on an apron $g$ and discharge them through the opening $b$. On their return travel the flights scrape the bottom of the tank, thereby picking up the pure iron ore and carrying it upward along the inclined part of the bottom and discharge it through the opening $c$. All openings are well packed and equipped with stuffing boxes so as to guard against escape of fumes.

The recovery apparatus comprises two sets. Each set consists of four inclined and one horizontal cylinder, all equipped with screw conveyers. Between each discharge opening in the separator and the first inclined cylinder $i$ of the corresponding set is a cast iron neck $h$ equipped with a strainer $y$. By means of screw conveyers $m$ the solids are conveyed successively through the inclined chambers $i$, $j$, $k$ and $l$. The first three cylinders are of the same construction, each being provided with an inlet $n$ for the solvent and an overflow outlet $o$. In these three chambers the separant is practically completely washed from the solids by the solvent. The solution, overflowing at $o$, passes to an evaporator $p$.

The fourth inclined cylinder $l$ is similar in construction to the preceding cylinders, but is not provided with an inlet for the solvent and has an outlet $q$ at its lower end. Cylinder $l$ therefore acts as a drainer, draining from the ore the solvent carried over from the third conveyer, which solvent also passes to the evaporator.

The fifth cylinder $r$ is arranged horizontally and acts as a drier, being steam jacketed. Herein the ore is completely dried, the solvent vapors being carried to a condenser $s$, to which are conveyed, also, the vapors from the evaporator $p$.

It will be understood that the solvent condensed in the condenser $s$ is returned to the chambers $i$, $j$ and $k$, while the separant in the evaporator $p$ is returned to the separating tank $a$.

It will be understood that the series of recovery cylinders shown is employed only for mechanical convenience, there being no necessity, at least in theory, for the use of a number, or any particular number, of separate recovery chambers.

While the invention contemplates the employment of equivalents of carbon bisulfid as a solvent for the separant, it is obvious that if any solvent is used which reacts with the bromid, not only will it result in a steady loss of bromid, but it will interfere with the distillation whereby the solvent is separated from the separating liquid.

While it will be understood that the step of the process involving the recovery of the the separant, as well as the separating step of the process, is essentially a cold process, it will be understood that the temperature of the room within which the process is carried on must be safely above the point at which the separant will solidify; or if that be not the case, the practice of the process does not exclude the application of artificial heat in the very mild degree required to maintain the separant liquid, which temperature however, should not, in that part of the apparatus in which the separant is washed from the solids by the solvent, reach the boiling point of the solvent, which, in the case of carbon bisulfid, is comparatively low. Thus, with tin bromid as a separant and carbon bisulfid as a solvent, the temperature in the separant recovery process should be between 29° C. and 46° C.

The word "separant" is used to mean a liquid into or upon which the solids to be separated is immersed or deposited and which, by reason of its specific gravity alone, or of the agitation to which it is subjected together with its specific gravity, separates the solids into particles of different specific gravity which respectively sink or float.

Having now fully described my invention, what I claim and desire to protect by Letters Patent is:

1. The process of recovering, from separated solids of different specific gravities, the liquid separant having a specific gravity between the specific gravities of such solids, used to effect their separation, which comprises washing the separated solids in a solvent of the separant which has a substantially lower boiling point than the separant and at a temperature above the melting point of the separant and below the boiling point of the solvent, and then recovering the separant from the solution by evaporating the solvent.

2. The process of recovering, from separated solids of different specific gravities, the liquid separant having a specific gravity between the specific gravities of such solids, used to effect their separation, which comprises washing the separated solids in a solvent of the separant which does not chemically react therewith and which has a substantially lower boiling point than the separant and at a temperature above the melting point of the separant and below the boiling point of the solvent, and then recovering the separant from the solution by distilling off the solvent.

3. The process of recovering, from separated solids of different specific gravities, the liquid separant, having a specific gravity between the specific gravities of such solids, used to effect their separation, which comprises washing the separated solids in a solvent of the separant which has a substantially lower boiling point than the separant and at a temperature above the melting point of the separant and below the boiling point of the solvent, and then recovering the separant from the solution by distilling off the solvent and recovering the solvent from the washed solids by distillation.

4. The process of recovering, from separated solids of different specific gravities, the liquid separant used to effect their separation, which comprises washing the separated constituents in a solvent of the separant which solvent has a substantially lower boiling point than the separant and at a temperature below the boiling point of the solvent until the solids are freed of the adhering separant, then draining from the solids all the solvent except that which remains thereon by adhesion, and then subjecting both the washed and drained off liquid and the solvent-coated solids to a temperature above the boiling point of the solvent and condensing the solvent vapors, thus permitting the re-use of the recovered separant and the condensed solvent respectively in separating and recovering.

5. The process of recovering, from separated solids of different specific gravities, the liquid separant having a specific gravity between the specific gravities of such solids, used to effect their separation, which comprises washing the separated solids in a solvent of the separant which will not chemically react or combine therewith except to form the solution.

6. The process of recovering from separated solids the liquid separant used to effect their separation from other solids of different specific gravity, which comprises washing the solids in a volume of liquid substantially in excess of the volume required to dissolve the separant adhering to the solids, said washing liquid being a solvent of the separant and one which will not chemically react or combine therewith except to form the solution, whereby any liquid adhering to the solids after washing will be mainly washing liquid.

7. The process of recovering tin bromid from solids which comprises washing the solids in liquid carbon bisulfid.

8. The process of recovering tin bromid from solids which comprises washing the solids in liquid carbon bisulfid and then recovering the tin bromid from the solution by distilling off the carbon bisulfid.

In testimony of which invention, I have hereunto set my hand, at New York, N. Y., on this 1st day of June, 1916.

ADRIAAN NAGELVOORT.